Nov. 29, 1966 J. CHABOSEAU 3,288,434

GAS TURBINE ADAPTED FOR PARTIAL ACTIVATION

Filed Aug. 6, 1965

Prior Art

INVENTOR.
Jean Chaboseau
BY
Pierce, Scheffler & Parker
Attorneys

United States Patent Office 3,288,434

Patented Nov. 29, 1966

1

2

3,288,434

GAS TURBINE ADAPTED FOR PARTIAL ACTIVATION

Jean Chaboseau, Boissy-St.-Leger, France, assignor to Aktiengesellschaft Brown, Boveri & Cie., Baden, Switzerland, a joint stock company Filed Aug. 6, 1965, Ser. No. 477,762
Claims priority, application France, Aug. 20, 1964, 985,715
6 Claims. (Cl. 253—78)

The present invention relates to an effective-power turbine adapted for partial activation and forming part of a gas-turbine plant which is fed by a plurality of driving mechanisms via one gas-inlet duct each, and whereof the nozzle-ring is subdivided into as many nozzle-segments as there are ducts.

There are known gas-turbine plants consisting of one or more driving mechanisms working in parallel as driving-gas generators and an effective-power turbine which follows in the gas-flow, transforms the energy in the driving gases into mechanical energy, and delivers the latter to the machine which it is required to drive.

A driving mechanism consists essentially of the compressor, usually made in the form of an axial-flow turbocompressor, the combustion chambers for raising the temperature of the driving gas, and a turbine which is directly coupled to the compressor and generates as much mechanical energy as the compressor requires. In this connection, no usable mechanical energy is delivered to the outside. Two-piece driving mechanisms of co-axial construction are also known, the low-pressure compressor being driven by a directly coupled low-pressure turbine, while the high-pressure compressor is directly coupled to the high-pressure turbine. These two shafts are mechanically independent of one another, usually rotate at different speeds, and deliver no mechanical energy to the outside.

The shaft of the subsequent effective-power turbine rotates independently of the shaft or shafts of the driving mechanisms. It delivers the generated mechanical energy to the driven machine, such, for example, as a generator, fan or ship's propeller.

If a plurality of driving mechanisms work in parallel onto a common effective-power turbine, satisfactory operation is possible only if the individual driving mechanisms work under the same conditions, i.e. if their driving-gas temperatures and pressures are the same as one another. In order to solve this problem in known embodiments, the driving gases are passed from the driving mechanism as far as the inlet to the impeller appliance in separate gas-ducts. As a result, the driving mechanisms are functionally separated from one another, and can be operated independently of one another. If one or more but not all the driving mechanisms are taken out of operation, the effective-power turbine is partially activated.

FIGURE 1 shows such an arrangement from the front. The axes, X, Y and Z of the three driving mechanisms are here parallel to the axis T of the effective-power turbine, whereof the nozzle-ring is subdivided into three nozzle-segments comprising 120° of the circumference, each being fed by one of the driving mechanisms, and designated T*x*, T*y* and T*z* respectively.

Such an arrangement solves the problem of starting the driving mechanisms separately, insofar as the said problem relates to these mechanisms. There remains, however, the disadvantage that the nozzle-ring and housing of the effective-power turbine are in contact with hot gases in those segments being fed by those driving mechanisms which are in operation, and with relatively cold gases in those segments belonging to the stationary driving mechanisms. It is generally known that such operational conditions give rise to thermal stresses which are calculated to damage the nozzle-ring and warp the housing.

The present invention is based on the problem of substantially reducing the asymmetry of thermal stresses and thermal expansions in the nozzle-ring and housing of the effective-power turbine of a gas-turbine plant with a plurality of driving mechanisms, enabling starting and operation to take place normally when the effective-power turbine is being partially activated.

Such an effective-power turbine is characterized by at least one annular chamber closed in itself, arranged in the region of the nozzle-ring or of the housing, and comprising apertures directed towards the gas-flow, the whole being such that during partial activation a gas-flow is set up inside the annular chamber in the circumferential direction and imparts uniformity to the temperature in those parts of the turbine adjacent to the annular chamber.

A known embodiment is illustrated in FIGURES 2 and 2*a*.

Figure 2:
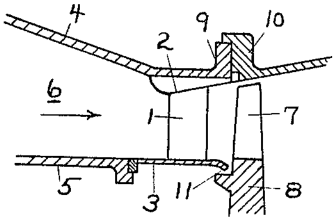
Figure 2A:
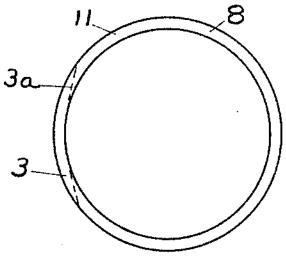

In FIGURE 2, which shows an axial section through the blade zone of an effective-power turbine, 1 designates a guide blade of the nozzle-ring, which blades are fastened to cover-strips 2, 3 fitted to the walls 4, 5 of a gas-inlet duct which leads from the driving mechanism to the turbine, those walls being essential parts of the turbine housing itself. After expanding in the guide blades 1, the gases flow through the rotor blades 7 which are fastened to the rotor 8. The gas-inlet ducts 6 are fastened by the flange 9 to a flange on the housing 10. If one of the driving mechanisms is no longer delivering any hot gasses, the inner cover-strip 3 of the nozzle-ring becomes deformed as indicated at **3*a*** in FIGURE 2*a*, resulting in a change in the shape of the gap 11 between the wheel 8 and the cover-strip 3, and making it possible for contact to take place between these components. Corresponding deformations of the flange 9 and the housing 10 also occur, as do forces in a direction parallel to the axis which load the points at which the nozzle-ring is attached to the walls 4, 5. The fact that these walls are differently heated causes them, by changing in length, to impart relative displacement to the cover-strips 2 and 3.

Figure 3:
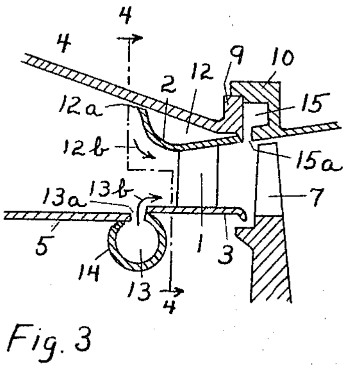
FIGURES 3 and 4 show an example of embodiment of the invention, FIGURE 4 depicting a partial elevation along the line 4—4 in FIGURE 3.

FIGURE 3 illustrates the same part of the machine as FIGURE 2. An annular chamber 12, closed in itself, is arranged round the tips of the guide blades 1 of the nozzle-ring between the cover-strip 2 and the wall 4. Apertures **12*a* provide permanent communication with the ducts 6**.

There is likewise an annular chamber 13 between the cover-strip 3 and the wall 5, which form between them a gap **13*a* by way of which the chamber 13 is in permanent communication with the ducts 6. The chamber 13 is formed by a suitably curved sheet of metal 14 whereof the edges are welded to the mutually facing ends of the cover-strip 3 and the wall 5**. The circular cross-sectional shape of the chamber shown as an example makes it capable of yielding in a manner adapted to the forces directed parallel to the axis of the machine.

FIGURE 3 furthermore shows an annular chamber 15 formed in the attachment flange of the housing 10. A gap 15*a* between this flange and the flange 9 of the gas-inlet duct provides permanent communication between chamber 15 and the space between the guide blades 1 and the rotor blades 7.

If all the driving mechanisms of a plant are in operation, the annular chambers 12, 13 and 15 are filled with almost stationary gas. During partial activation, a flow of hot gases is set up inside the annular chambers in the circumferential direction. This flow is maintained by the driving mechanisms which are in operation, and which feed in gases through the apertures of these chambers. These gases flow into the gas-inlet duct of the stationary driving mechanism because of the lower pressure prevailing there. In this way, they keep the nozzle-segment associated with the stationary driving mechanism and the housing of the effective-power turbine at a fitting temperature.

Figure 4:
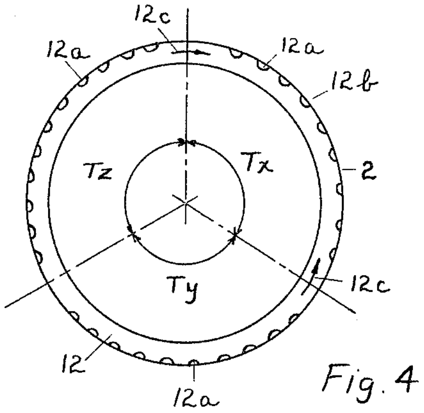

FIGURE 4 shows diagrammatically the movement of gas in front of the nozzle-ring for the chamber 12, when the driving mechanism X is stationary and the other two driving mechanisms are in operation. The hot gases proceeding from the driving mechanisms Y and Z pass through the apertures 12*a* in their nozzle-segment into the chamber 12 wherein they flow in the direction of the arrows 12*c*, and emerge again through the apertures 12*a* in the nozzle-segment T*x* associated with the unactivated driving mechanism X (arrows 12*b* in FIGURES 3 and 4). It follows from this that the cover-strip 2 of the nozzle-ring is in contact with two streams of hot gas: one flows inside in the circumferential direction, following the arrows 12*c*; the other flows axially outside the annular chamber, following the arrows 12*b*. The same applies to the chambers 13 and 15.

Figure 5:
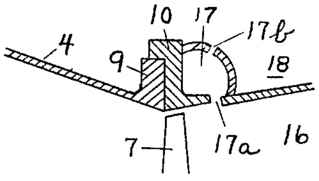
FIGURE 5 illustrates a variant of FIGURE 3.
Figure 1:
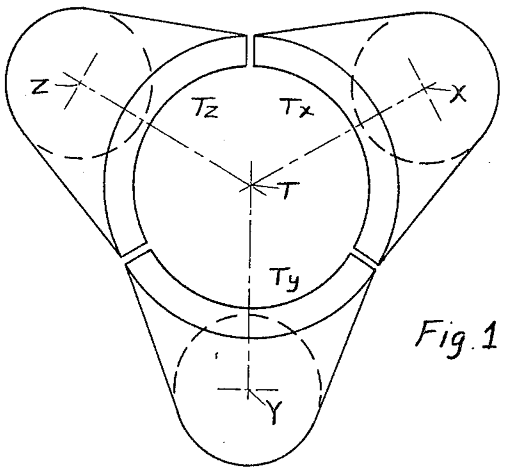

FIGURE 5 shows a variant in which an annular chamber 17 is arranged behind the housing 10 at the inlet to the diffusor space 16. As a result of this variant, and in opposite fashion to the case of the other annular chambers 12, 13 and 15, gas from the unactivated part of the turbine can enter the annular chamber 17, and in the activated part of the turbine can emerge again into the diffusor space 16. In addition, a flow from the surrounding space 18 can proceed through the apertures 17*b* and 17*a* and through the annular chamber 17 into the diffusor space 16.

I claim:

1. An effective power gas turbine adapted to be driven by one or more of the respective useful gas outputs of a plurality of driving mechanisms each constituted by a gas turbine driven compressor, said effective power turbine comprising a nozzle ring located in advance of the first row of blading thereof, said nozzle ring being sub-divided into the same number of nozzle segments as there are driving mechanisms, a gas inlet duct to each of said nozzle segments for conducting thereto the respective gas outputs from said driving mechanisms, and an annular chamber concentric with and located in the vicinity of said nozzle ring, said annular chamber being provided with a series of circumferentially spaced apertures opening in the direction of and into said nozzle segments, said annular chamber receiving gas flow through those apertures from such of said nozzle segments as are being supplied with gas outputs from the appertaining driving mechanisms in operation and discharging the same through those apertures into the nozzle segments correlated with non-operating driving mechanisms, thereby to maintain all of said nozzle segments and adjacent structural parts of said effective power turbine at a substantially uniform temperature notwithstanding a condition wherein less than all of said driving mechanisms are operating.

2. An effective power gas turbine adapted to be driven by one or more of the respective useful gas outputs of a plurality of driving mechanisms each constituted by a gas turbine driven compressor, said effective power turbine comprising a nozzle ring located in advance of the first row of blading thereof, said nozzle ring being sub-divided into the same number of nozzle segments as there are driving mechanisms, a gas inlet duct to each of said nozzle segments for conducting thereto the respective gas outputs from said driving mechanisms, and an annular chamber concentric with and located adjacent to said nozzle ring and provided with a series of circumferentially spaced apertures opening in the direction of and in communication with said nozzle ring segments, said annular chamber receiving gas flow through said apertures from such of said nozzle segments as are being supplied with gas outputs from the appertaining driving mechanisms in operation and discharging the same through those apertures into such of said nozzle segments as are correlated with non-operating driving mechanisms, thereby to maintain all of said nozzle segments and adjacent structural parts of said effective power turbine at a substantially uniform temperature notwithstanding a condition wherein less than all of said driving mechanisms are operating.

3. An effective power gas turbine as defined in claim 2 wherein said annular chamber is located radially inward of the inner wall of said nozzle ring.

4. An effective power gas turbine as defined in claim 2 wherein said annular chamber is located radially outward of the outer wall of said nozzle ring.

5. An effective power gas turbine adapted to be driven by one or more of the respective useful gas outputs of a plurality of driving mechanisms each constituted by a gas turbine driven compressor, said effective power turbine comprising a nozzle ring located in advance of the first row of blading thereof, said nozzle ring being sub-divided into the same number of nozzle segments as there are driving mechanisms, a gas inlet duct to each of said nozzle segments for conducting thereto the respective gas outputs from said driving mechanisms, and an annular chamber concentric with and located radially outward of and between a first row of stationary guide blading and the adjacent row of blading on the rotor, said annular chamber being provided with a series of circumferentially spaced apertures opening in the direction of and in communciation with the annular space between said rows of guide and rotor blading, said annular chamber receiving gas flow through said apertures from such portions of said annular space as are correlated to those nozzle segments being supplied with gas outputs from the appertaining driving mechanisms in operation and discharging the same through those apertures into such portions of said annular space as are correlated with non-operating driving mechanisms, thereby to maintain all parts of said annular space and adjacent structural parts of said effective power turbine at a substantially uniform temperature notwithstanding a condition wherein less than all of said driving mechanisms are operating.

6. An effective power gas turbine adapted to be driven by one or more of the respective useful gas outputs of a plurality of driving mechanisms each constituted by a gas turbine driven compressor, said effective power turbine comprising a nozzle ring located in advance of the first row of blading thereof, said nozzle ring being sub-divided into the same number of nozzle segments as there are driving mechanisms, a gas inlet duct to each of said nozzle segments for conducting thereto the respective gas outputs from said driving mechanisms, and an annular chamber concentric with and located radially outward of and adjacent the discharge side of the first row of balding on the rotor of said effective power turbine, said annular chamber being provided with a series of circumferentially spaced apertures opening in the direction of and in communication with the space at the gas discharge side of said first row rotor blading, said annular chamber receiving gas flow through said apertures from such portions of said space at the gas discharge side of said first row of rotor blading as are correlated to those nozzle segments being supplied with gas outputs from the appertaining driving mechanisms in operation and discharging the same through those apertures into such portions of said space at the gas discharge side of said first row of rotor blading as are correlated with non-operating driving mechanisms, thereby to maintain all parts of said space at the gas discharge side of said first row of rotor blading and adjacent structural parts of said effective power turbine at a substantially uniform temperature notwithstanding a condition wherein less than all of said driving mechanisms are operating.

References Cited by the Examiner

UNITED STATES PATENTS

| | | | |
|---|---|---|---|
| 2,494,328 | 1/1950 | Bloomberg. | |
| 2,625,367 | 1/1953 | Rainbow et al. ---- | 253—78 X |
| 2,685,405 | 8/1954 | Stalker. | |

MARTIN P. SCHWADRON, *Primary Examiner.*

E. A. POWELL, Jr., *Assistant Examiner.*